United States Patent [19]
Morris

[11] Patent Number: 4,567,983
[45] Date of Patent: Feb. 4, 1986

[54] THEFT RESISTANT CASSETTE HOLDER
[75] Inventor: William L. Morris, Troy, Mich.
[73] Assignee: Handleman Company, Clawson, Mich.
[21] Appl. No.: 663,333
[22] Filed: Oct. 22, 1984

Related U.S. Application Data

[63] Continuation-in-part of Ser. No. 598,024, Apr. 9, 1984.
[51] Int. Cl.⁴ .................................. B65D 85/672
[52] U.S. Cl. .................... 206/387; 206/1.5; 206/807; 220/307
[58] Field of Search ........... 206/1.5, 387, 807, 45.14; 220/306, 307

[56] References Cited

U.S. PATENT DOCUMENTS

| | | |
|---|---|---|
| 1,076,635 | 10/1913 | Howard . |
| 1,791,094 | 2/1931 | Albert . |
| 1,806,149 | 5/1931 | Daugherty . |
| 1,899,547 | 2/1933 | Addis et al. . |
| 2,018,861 | 10/1935 | Mertz . |
| 2,047,790 | 7/1936 | Mascarenhas . |
| 2,157,954 | 5/1939 | Gould . |
| 2,643,811 | 6/1953 | Bolding . |
| 2,738,056 | 3/1956 | Heller . |
| 2,807,404 | 9/1957 | Cote . |
| 2,974,784 | 3/1961 | Britt . |
| 3,035,751 | 5/1962 | Brown . |
| 3,111,222 | 11/1963 | Mueller, Jr. . |
| 3,232,421 | 2/1966 | Young . |
| 3,254,759 | 6/1966 | Britton . |
| 3,272,325 | 9/1966 | Schoenmakers . |
| 3,381,810 | 5/1968 | Lasher et al. . |
| 3,443,710 | 5/1969 | Hills ................................ 220/94 A |
| 3,481,453 | 12/1969 | Shreve, III et al. . |
| 3,495,716 | 2/1970 | Gregory ............................ 206/387 |
| 3,578,154 | 5/1971 | Martelli . |
| 3,587,837 | 6/1971 | Smith et al. . |
| 3,650,382 | 3/1972 | Braun et al. . |
| 3,656,612 | 4/1972 | Sellors . |
| 3,675,763 | 7/1972 | Sandel . |
| 3,682,297 | 8/1972 | Austin et al. . |
| 3,776,374 | 12/1973 | Medendorp . |
| 3,828,922 | 8/1974 | Holkestad ......................... 206/387 |
| 3,871,516 | 3/1975 | Holkestad et al. ................. 206/387 |
| 3,998,324 | 12/1976 | Roccaforte . |
| 4,002,355 | 1/1977 | Sendor . |
| 4,049,119 | 9/1977 | Wilson . |
| 4,063,229 | 12/1977 | Welsh et al. . |
| 4,098,402 | 7/1978 | Rogg . |
| 4,134,495 | 1/1979 | Friedman . |
| 4,216,857 | 8/1980 | Huang . |
| 4,241,859 | 12/1980 | Eames . |
| 4,245,741 | 1/1981 | Holkestad . |
| 4,381,836 | 5/1983 | Rivkin et al. .................... 206/45.14 |

FOREIGN PATENT DOCUMENTS 3113809 10/1982 Fed. Rep. of Germany ...... 206/387
2040267A 8/1980 United Kingdom ................ 220/306

Primary Examiner—William T. Dixson, Jr.
Assistant Examiner—Jimmy G. Foster
Attorney, Agent, or Firm—Harness, Dickey & Pierce

[57] ABSTRACT

A theft resistant cassette tape holder is provided which retains a conventional cassette tape assembly such that it is not easily shoplifted since it becomes too large to be easily secured on the person of a would-be thief. The cassette holder includes a body having a handle portion and a cassette tape engaging portion. A cassette is slid into position within the cassette engaging portion whereupon an endpiece is snapped into position at the open end. This endpiece cannot be easily disassembled and the unit must be cut by scissors or another sharp instrument permitting the cassette to be removed upon sale. Engagement between the endpiece and body portion occurs by the interaction between a plurality of hooks engaging a plurality of slots formed between two plate surfaces. The holder is formed such that the end piece can be formed within an aperture of the carrying handle portion, thereby permitting the entire holder to be constructed in an injection molding die of minimal size.

6 Claims, 12 Drawing Figures

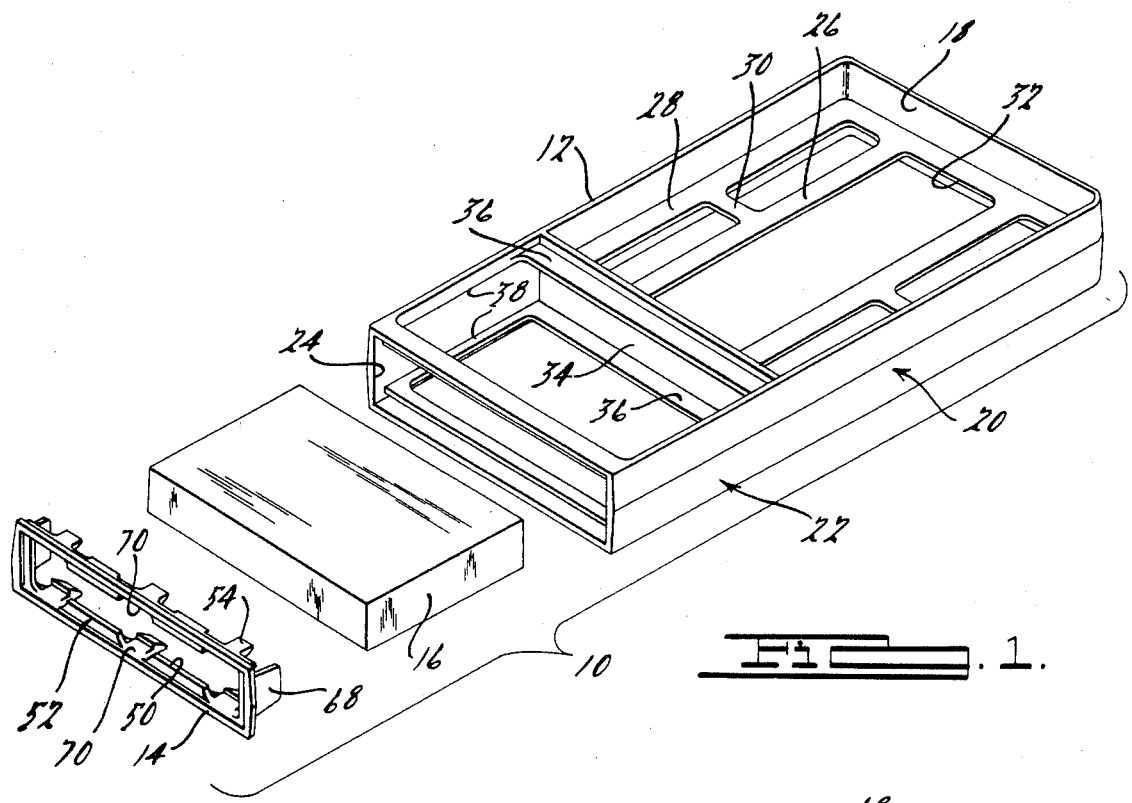
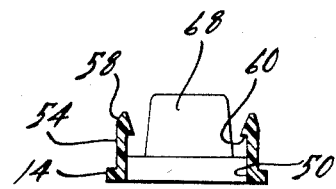
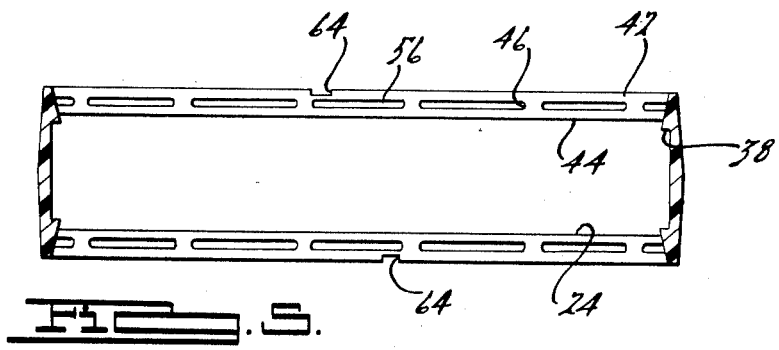

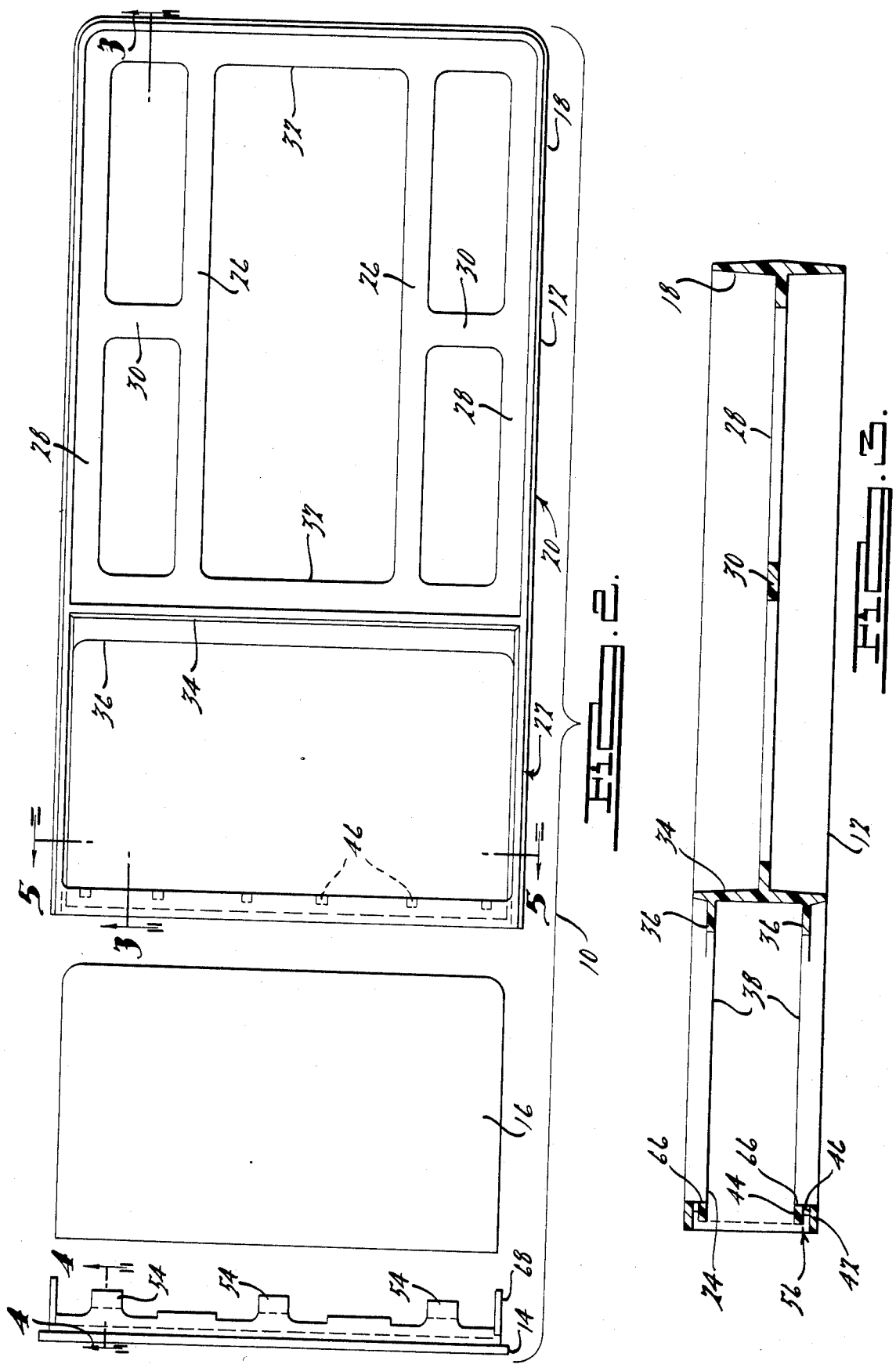

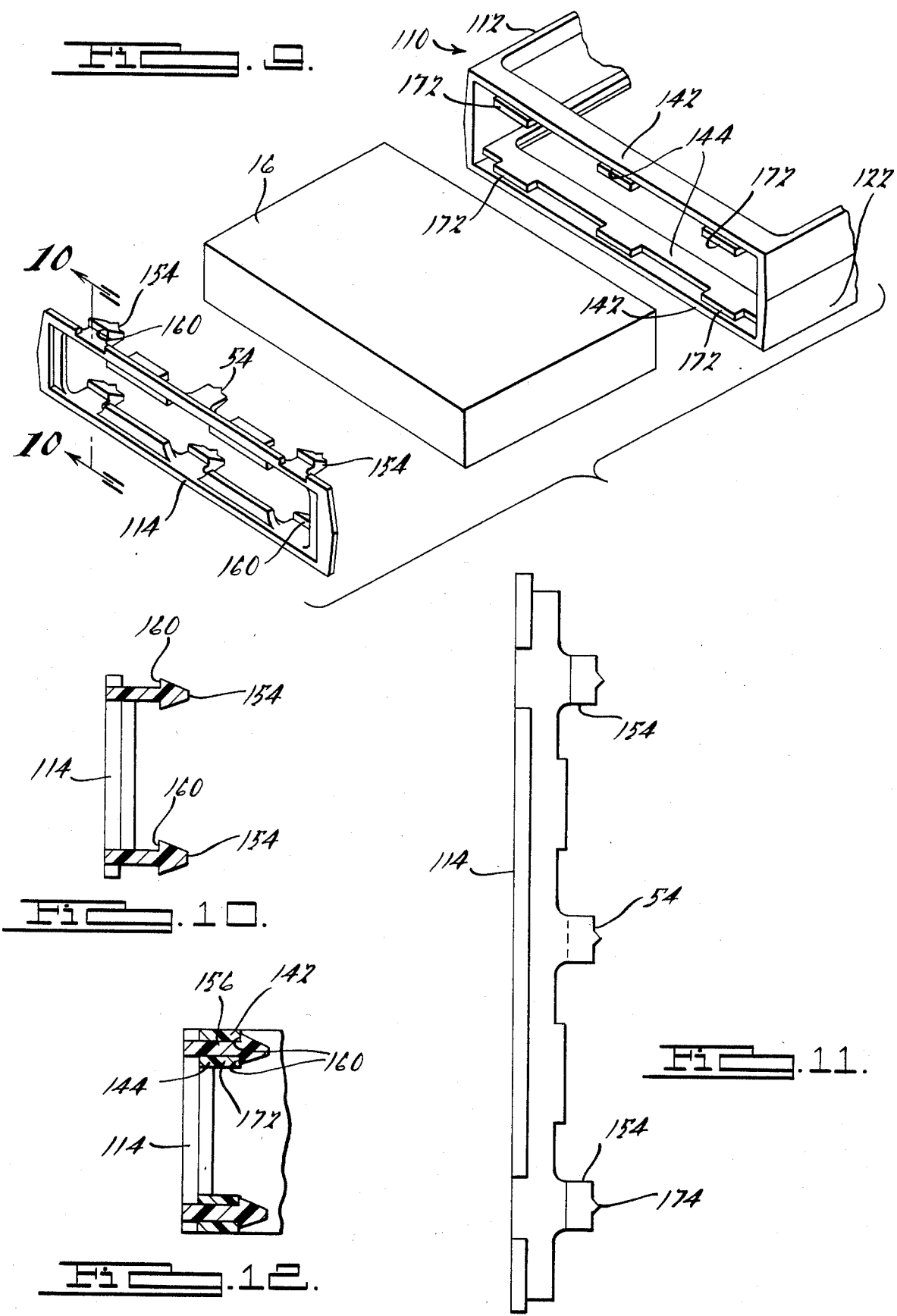

THEFT RESISTANT CASSETTE HOLDER

CROSS REFERENCE TO RELATED APPLICATIONS

This application is a continuation-in-part of copending patent application Ser. No. 598,024 filed Apr. 9, 1984.

BACKGROUND AND SUMMARY OF THE INVENTION

This invention relates to a package for articles and more particularly, to a theft resistant package for holding cassette tapes and the like, rendering these articles less susceptible to pilfering by shoplifters.

Magnetic recording tapes are packaged into cassettes which may be used to record and play audio information such as music, or may be employed in connection with digital electronic systems for storing programs or data. Although the small size of cassette tapes are an asset to the user in terms of their portability and storage, their small size renders them a target for shoplifters since they are easily hidden in pockets or handbags when the cassette tapes are not placed under lock and key. For this reason, enlarged cassette holders are often provided which make it very difficult for the cassette tape with the associated holder to be easily hidden on the person of a potential shoplifter, thereby minimizing unauthorized removal of these articles. Cassette holders must be designed so that they are not easily disassembled by shoppers, or shoplifters who would simply extract the cassette tapes from them. Often a special purpose tool is provided or a portion of the holder is cut with scissors or a knife in order to permit the tape to be released and used by the purchaser.

Since a theft resistant cassette holder is intended for the limited purpose of preventing the articles they contain from being wrongfully taken, they must be inexpensive to manufacture, reliable in the sense of preventing unauthorized extraction of the contents thereof, and must be attractive aesthetically since these articles are a part of the product display. A theft resistant cassette holder must further be simple to assemble and disassemble, so that special equipment is not needed.

It is, therefore, a principal aspect of this invention to provide a theft resistant cassette holder which provides a high level of resistance to unauthorized disassembly. It is an additional aspect of this invention to provide a theft resistant cassette holdeer which is attractive in appearance and which is inexpensive to produce. It is yet an additional aspect of this invention to provide a theft resistant cassette holder which is easily assembled by unskilled employees and which does not necessitate additional equipment for assembly or disassembly (although assembly equipment could be utilized to increase the production rate if desired).

A number of prior art references generally describe theft resistant packaging. Below is a tabulation of these references.

| U.S. Pat. No. | Inventor | Date |
| --- | --- | --- |
| 2,738,056 | A. H. Heller | 3/13/56 |
| 3,495,716 | J. D. Gregory | 2/17/70 |
| 3,587,837 | J. R. Smith, et al | 6/28/71 |
| 3,650,382 | S. Braun, et al | 3/21/72 |
| 3,656,612 | T. J. Sellors | 4/18/72 |
| 3,675,763 | H. N. Sandel | 7/11/72 |
| 3,682,297 | T. K. Austin, et al | 8/8/72 |
| 3,776,374 | R. L. Mendendorp | 12/4/73 |
| 3,828,922 | H. P. Holkestad | 8/13/74 |
| 3,871,516 | H. P. Holkestad, et al | 3/18/75 |
| 4,245,741 | H. P. Holkestad | 1/20/81 |

None of the above references, however, teach the novel aspects of the cassette holder according to this invention.

The above principal aspects according to this invention are provided by a cassette holder structure made from two pieces, a body and an endpiece. The endpiece interlocks with the body to trap a cassette tape container within one portion of the holder. The endpiece is securely fastened to the body by hook and slot engagements between these two parts. Manufacturing optimization is provided by forming the endpiece within an open interior area of the body. This manufacturing technique results in a injection molding die size which is smaller than the die which would otherwise be necessary to form both parts of the holder.

Additional objects and advantages of the present invention will become apparent from reading of the detailed description of the preferred embodiments which makes reference to the following set of drawings:

BRIEF DESCRIPTION OF THE DRAWINGS

FIG. 1 is an exploded pictorial view of the theft resistant cassette holder according to this invention;

FIG. 2 is a top view of the cassette holder according to this invention, showing a cassette tape assembly and the holder endpiece in exploded positions;

FIG. 3 is a cross-sectional view taken along line 3—3 of FIG. 2;

FIG. 4 is a cross-sectional view taken through line 4—4 of FIG. 2, particularly showing the configuration of the endpiece;

FIG. 5 is a cross-sectional view taken along line 5—5 of FIG. 2, particularly showing the slots within which the endpiece hooks engage;

FIG. 9 is a partial exploded pictorial view of an alternate embodiment of a cassette holder according to this invention showing a cassette tape assembly and the holder endpiece in exploded positions;

FIG. 10 is a cross-sectional view taken along line 10—10 of FIG. 9 particularly showing the configuration of the endpiece;

FIG. 11 is a side view of the endpiece shown in FIG. 9; and

FIG. 12 is a partial cross-sectional view also taken along line 10—10 of FIG. 9 showing the endpiece and body in an assembled configuration.

DETAILED DESCRIPTION OF THE INVENTION

Figure 7:
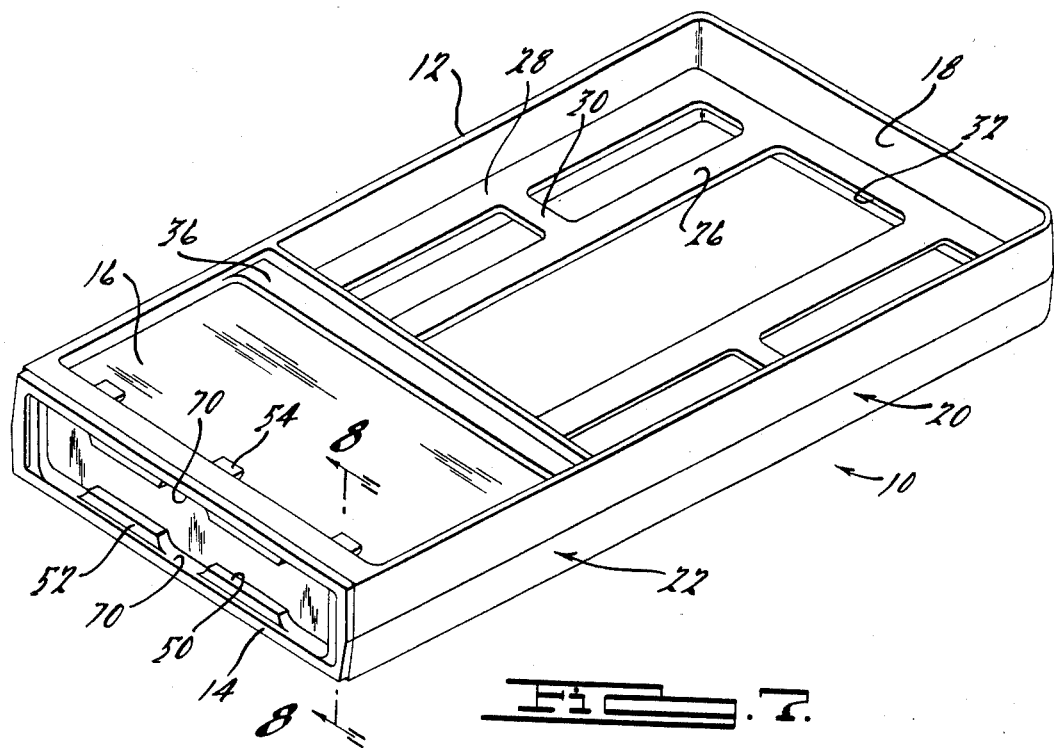
FIG. 7 is a pictorial view of the theft resistant cassette holder according to this invention in an assembled configuration.
Figure 6:
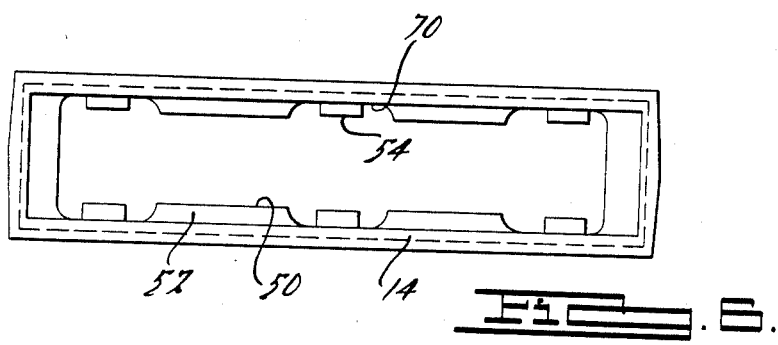
FIG. 6 is an end view of the holder endpiece.

A theft resistant cassette holder according to a first embodiment of this invention is shown particularly by FIGS. 1, 2 and 7 and is generally designated by reference character 10. Cassette holder 10 is comprised of two primary components, body 12 and endpiece 14. The cassette holder is adapted to retain a conventional cassette tape assembly designated by reference character 16. Cassette tape assembly 16 includes a closely fitting tape box which may be of the type described by U.S. Pat. No. 3,272,325 issued on Sept. 13, 1966, to J. J. M. Schoenmakers. This box prevents injury or contamination of the enclosed cassette.

Body 12 includes carrying handle portion 20 and cassette engaging portion 22. Handle portion 20 provides a means for handling the cassette and enlarges the size of the article for theft deterrence, while engaging portion 22 provides a means for retaining the cassette. Body 12 features a laterally extending perimeter edge 18 which forms the perimeter of the entire body except at end aperture 24. Carrying handle portion 20 includes a number of internal reinforcement webs; 26, 28 and 30. These webs provide rigidity so that handle portion 20 is not easily deformed, thereby preventing the entire device from being compressed and therefore easily hidden by a shoplifter. Carrying handle portion 20 further forms internal aperture 32 which is sufficiently large so that endpiece 14 may be formed therein during molding of body 12. By allowing endpiece 14 to be formed within an aperture of body 12, the overall size of the injection molding die can be reduced, thereby resulting in production tooling cost savings as compared with cassette holders having a larger die area. Alternatively, a larger number of cassette holders 10 may be formed in a multiple cavity die of a given size, as compared with prior art designs.

At the boundary between carrying handle portion 20 and cassette engaging portion 22 is partition 34. Patition 34 acts as one of the boundaries which traps cassette assembly 16 within cassette engaging portion 22. Partition 34 may be formed as a continuous surface or as a plurality of webs. Joining partition 34 is a pair of webs 36 which further act to restrain cassette assembly 16 within cassette engaging portion 22. Webs 36 lie within parallel planes which are separated by the thickness of cassette tape assembly 16.

The end of body 12 adjacent cassette engaging portion 22 forms cassette engaging end aperture 24 which permits a cassette assembly to be inserted within cassette engaging portion 22. Cassette engaging portion 22 provides a path which closely receives cassette assembly 16 so that the assembly may be inserted through end aperture 24 until the position illustrated by FIG. 7 is reached. With reference to FIG. 3, the portion of body 12 adjacent end aperture 24 includes a pair of parallel plates, outer plates 42 and inner plates 44. Inner plates 42 lie in parallel planes with webs 36 so that the inner plates also act to closely receive cassette assembly 16 and act as barriers preventing removal of the cassette. Outer plates 44 are spaced outwardly from the inner plates forming slots 56 therebetween. Outer and inner plates, 42 and 44 respectively, are joined at a number of intermediate locations by webs 46. Along the side surfaces of perimeter edge 18 within engaging portion 22 are edges 38 which are formed along planes which webs 36 and inner plates 44 lie in. Edges 38 further act to retain cassette assembly 16. Since edges 38 are not necessary to provide acceptable retention of cassette 16, an alternate embodiment of this invention could be made by deleting these edges.

The configuration of endpiece 14 is best explained with reference to FIGS. 1, 2, 4 and 6. Endpiece 14 has a perimeter edge defining aperture 50. Aperture 50 is provided to enable the potential cassette purchaser to read the title and other written information typically located on the end surface of currently available cassette tapes and to enable cutting of the holder to release the cassette assembly. Extending a short distance within aperture 50 is a plurality of flanges 52 which act to engage cassette assembly 16 preventing removal of the cassette through the aperture. Endpiece 14 is attached to body 12 by engagement between a plurality of hooks 54 within slots 56. Excellent results have been achieved by providing a total of six hooks 54, as shown by the Figures. This number of hooks provides adequate retention of parts, yet enables easy assembly.

Figure 8:
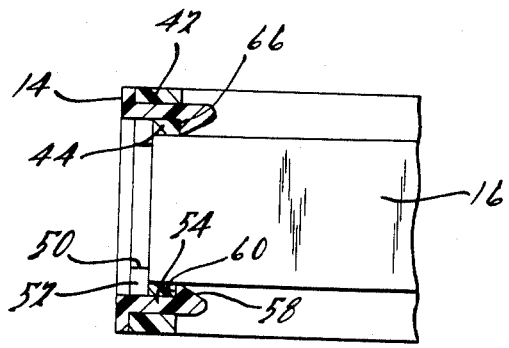
FIG. 8 is a cross-sectional view taken along line 8—8 of FIG. 7 showing the engagement between the endpiece, hooks and the body slots when the endpiece is in an assembled position.

The configuration of hooks 54 is best shown by FIGS. 4 and 8. Hooks 54 included pointed ends 58 which, when directed between outer and inner plates 42 and 44, cause the plates to become separated as the hooks are inserted into slots 56. Once hooks 54 are fully inserted between plates 42 and 44, hook edge surface 60 engages an edge surface 66 of inner plate 44, as shown in FIG. 8. The normal positioning of outer and inner plates 42 and 44 is such that they are normally separated by a distance less than the lateral width of pointed end 58 so that once hooks 54 are fully inserted, the plates prevent withdrawal of hooks 54 from slots 56. Hook edge surface 60 lies along a plane parallel with end aperture 50 so that an external force exerted on endpiece 14 does not cause plates 42 and 44 to become separated or allow removal of cassette assembly 16. Endpiece 14 further includes a pair of tabs 68 located at the ends of the endpiece, as shown by FIG. 2. These tabs act to locate endpiece 14 within end aperture 24 and further prevent the use of a pry tool by someone attempting to separate the endpiece from body 12.

Several embossed surfaces 64 are provided within outer plate 42 which, for convenience of store personnel, indicate the location at which the plate portions 42 and 44 should be cut by scissors or another sharp instrument, thus permitting the cassette to be withdrawn from cassette holder 10 when the cassette is being purchased. To facilitate cutting open of the holder 10, cut-out areas 70 are provided in end aperture 50. The cut-out areas 70 provide portions of reduced thickness which are in alignment with notches 64.

A theft resistant cassette holder 10 according to this invention must be cut through at least one of the pairs of plates 42 and 44 in order to permit withdrawal of the cassette assembly 16. If desired, the plates 42 and 44 can be cut in two places (top and bottom) in order to allow the holder to be opened more fully for easier removal of the cassette. The invention can be constructed to hold and secure the cassette in such a tight fitting relationship that severing the plates 42 and 44 in two places is necessary for ready removal of the cassette.

The theft resistant cassette holder 10 according to this invention is preferably formed from a polymeric material such as polypropolyene which provides sufficient resiliency to permit deflection of plates 42 and 44 as hooks 54 are inserted therebetween, and permits cutting by scissors. These materials are also easily worked and are relatively inexpensive.

A second embodiment according to this invention is shown in FIGS. 9 through 11. Elements of the second embodiment corresponding to those of the first element are identified by reference numbers equal to the previously used reference numbers with 100 added thereto. FIG. 9 shows a partial exploded view of cassette holder 110 having body portion 112 and end piece 114. As with the first embodiment, cassette tape assembly 16 becomes inserted within engaging portion 122 and is trapped there when end piece 114 is snapped into position onto body 112. The second embodiment varies from the described first embodiment in terms of the configuration of the interengaging structures of end piece 114 and body 112. Like the first embodiment, end piece 114 includes six engaging hooks 54 and 154. Hooks 54 are positioned at near the center line of end piece 14 and are substantially identical to the hooks described in connection with the first embodiment. However, hooks 154 are unlike hooks 54 in that each forms a pair of hook edge surfaces 160. The configuration of hooks 154 is best shown with reference to FIGS. 10 and 11. By providing modified hooks 154, the strength of engagement between end piece 114 and body 112 is enhanced, thereby providing additional anti-theft protection. Hooks 54 and 154 shown by FIGS. 9-11 further include a pointed end 174 which aids in guiding the teeth into engagement with body 112.

In order to accommodate hooks 154, body 112 must also be modified. Inner plate 144, particularly shown in FIG. 9, includes one or more extended tab portions 172 which extend toward the end of end piece 112 so that they have an edge which terminates flush with outer plates 142. Tab portions 172 are provided so that as end piece 114 is pushed into locking engagement with body 112, both edges of hooks 154 engage the inner and outer plates and cause them to spread apart. Without tab portions 172, engagement between outer plate 142 and hook 154 would cause deflection of the hook so that it would not easily be guided into slot 156 formed between the inner and outer plates. As shown by FIG. 12, once end piece 114 is installed into locking engagement 112, hook 154 provides a pair of opposing edges 160 which engage both the inner and outer plates 142 and 144. Due to the enhanced retention of end piece 114 onto body 112, tabs 68 provided with the first embodiment are considered unnecessary. Cassette holder 110 is in all other respects identical with cassette holder 10 previously described.

While the above description constitutes the preferred embodiments of the present invention, it will be appreciated that the invention is susceptible to modification, variation and change without departing from the proper scope and fair meaning of the accompanying claims.

I claim:

1. A theft resistant holder for a cassette tape assembly which, after assembly, must be destroyed to enable removal of said cassette tape assembly comprising;

a rectangular unitary body defining a longitudinal and a lateral axis, said body having a perimeter flange extending perpendicular to both of said axes forming side walls and an end wall, said body having a partition extending between said side walls to define a handle portion and a cassette tape holding portion arranged along said longitudinal axis, said handle portion having internal web means reinforcing said handle portion, the end portion of said cassette tape holding portion longitudinally opposite said end wall of said handle portion forming an end aperture adapted for receiving said cassette tape assembly when said cassette tape assembly is inserted in the direction of said longitudinal axis, said cassette tape holding portion defining a cavity which closely receives and retains said cassette tape assembly, said end aperture bordered on opposing sides by a pair of inner plates with a pair of outer plates spaced from said inner plates to define longitudinally opening slots, said inner plates connected to said outer plates by webs, and a rectangular endpiece separate from said body and attachable thereto to enclose said end aperture thereby trapping said cassette assembly therein such that destruction of said holder is required in order to remove said cassette tape assembly, said endpiece having a plurality of hooks each having a pair of hook edge surfaces, one engaging one of said inner plates and the other engaging one of said outer plates whereby said endpiece interlocks with said cassette tape holding portion when inserted within said slots so as to be nonremovable.

2. The theft resistant holder according to claim 1 wherein said handle portion forms an internal aperture sufficiently large to enable said endpiece to be formed within said internal aperture.

3. The theft resistant holder according to claim 1 wherein said endpiece forms an endpiece aperture having a perimeter forming sections of reduced cross-sectional area thereby permitting simplified cutting in those areas to enable removal of said cassette tape assembly from said holder.

4. The theft resistant holder according to claim 1 wherein six of said hooks are provided on said endpiece.

5. The theft resistant holder according to claim 1 wherein said hooks having pointed ends which aid in guiding said hooks into engagement with said inner and outer plates.

6. The theft resistant holder according to claim 1 wherein said inner plates have portions which are recessed with respect to said outer plates and said end apertures, said inner plates having outer portions which are flush with respect to said outer plates and said end aperture.

* * * * *